United States Patent [19]

Ketterer

[11] 4,309,947
[45] Jan. 12, 1982

[54] MOUNTING ARRANGEMENT FOR CONDENSATE NEUTRALIZER IN A FURNACE

[75] Inventor: Edward A. Ketterer, St. Joseph Township, Berrien County, Mich.

[73] Assignee: Heil-Quaker Corporation, Lewisburg, Tenn.

[21] Appl. No.: 134,078

[22] Filed: Mar. 26, 1980

[51] Int. Cl.³ .............................................. F23J 15/00
[52] U.S. Cl. .................................. 110/203; 110/216; 110/345; 422/178
[58] Field of Search .................. 110/203, 216, 345; 126/110 R, 116 R; 422/173, 279, 178; 55/267

[56] References Cited

U.S. PATENT DOCUMENTS

| | | | |
|---|---|---|---|
| 1,620,155 | 3/1927 | Hilliard | 55/512 |
| 3,683,593 | 8/1972 | Kent | 55/512 X |
| 3,726,239 | 4/1973 | Burbach | 110/216 |
| 3,735,567 | 5/1973 | Viers | 55/233 |
| 3,751,231 | 8/1973 | Niedzielski | 55/511 X |
| 3,944,136 | 3/1976 | Huie | 126/116 R X |
| 4,164,210 | 8/1979 | Hollowell | 126/110 R |

Primary Examiner—Edward G. Favors
Attorney, Agent, or Firm—Wegner, Stellman, McCord, Wood & Dalton

[57] ABSTRACT

A high efficiency domestic furnace incorporates means for separating and neutralizing flue gas condensate. Acidic condensate from the flue gas products of combustion is neutralized by contact with neutralizing material in a housing through which the condensate is flowed. The use of the neutralizer in connection with a high efficiency domestic furnace permits discharge of the condensate directly to the household drain. The neutralizer is arranged to be self-flushing and defines a serpentine, series flow path and is arranged to discharge the neutralized condensate as a result of the entry of additional acidic condensate at its inlet. To enhance the operation of the neutralizer, it is arranged to be vibrated during normal operation of the furnace.

11 Claims, 4 Drawing Figures

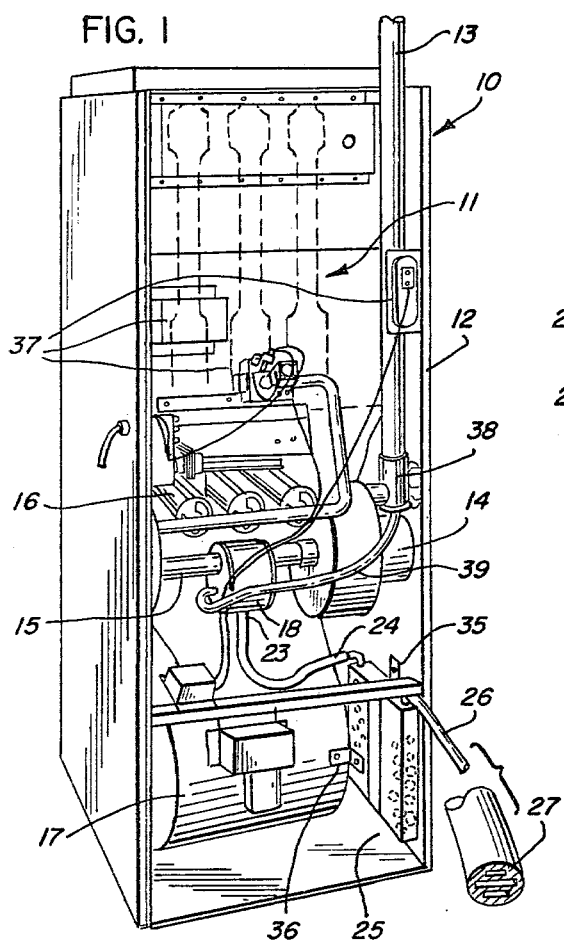
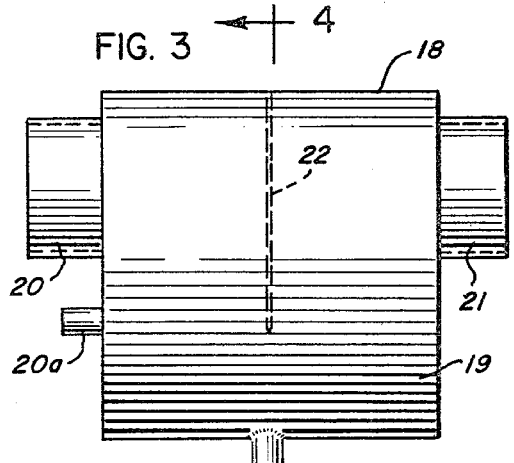
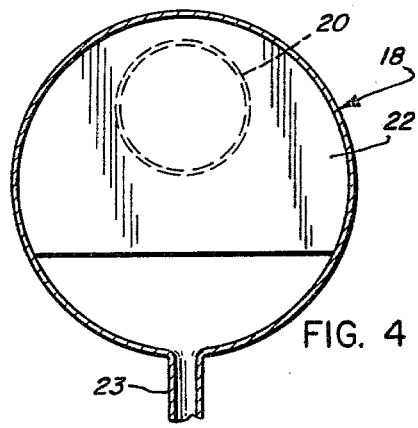
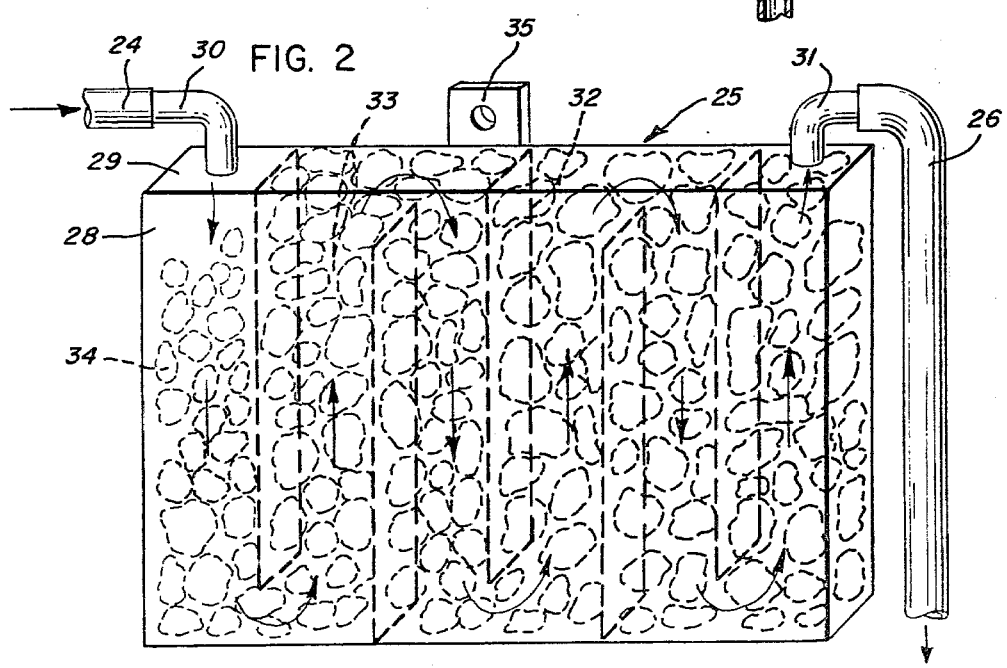

MOUNTING ARRANGEMENT FOR CONDENSATE NEUTRALIZER IN A FURNACE

BACKGROUND OF THE INVENTION

1. Field of the Invention

This invention relates to domestic furnaces, and in particular to a furnace having means for effectively separating and neutralizing acidic condensate from the flue gas and suitably discharging the condensate to a household drain.

2. Background Art

In U.S. Pat. No. 4,164,210 of George T. Hollowell, a domestic-type furnace is shown to have a secondary heat exchanger providing a high efficiency wherein the flue gases are discharged at a relatively low temperature whereby a portion thereof may condense. To remove any resulting condensate, a drain is provided at the bottom of the secondary heat exchanger.

A problem arises in a furnace system such as taught by the Hollowell patent in that the products of combustion of conventional hydrocarbon furnace fuels include acidic products. Natural gas, for example, frequently contains some amount of sulfur which, when burned with the gas, produces sulfur dioxide or sulfur trioxide in addition to the normal combustion products of carbon dioxide and water vapor. When condensed, these combustion products produce a weak sulfuric acid solution. The dumping of such acidic condensate directly into a conventional household drain may not be advisable in all cases. The present invention comprehends providing an improved neutralizing means for neutralizing such acidic condensate, permitting satisfactory discharge of the condensate into the conventional household drain.

A number of prior art patents disclose commercial means for the scrubbing of gas. Illustratively, Roger Kent, in U.S. Pat. No. 3,683,593, shows a gas scrubber having a wet filter bed with layers of stacked filter elements. The filter elements used may be spherical glass marbles, and the filter bed is periodically tilted or moved to displace the filter elements and enhance the gas scrubbing action. Charles S. Viers, in U.S. Pat. No. 3,735,567, shows a gas scrubber in the form of a muffler provided with a filter containing gas-cleaning water. The exhaust gas pressure is utilized to vaporize and circulate the gas-water mixture over the filtering material so as to improve the gas washing and filtering action and prevent clogging.

Henry Burbach, in U.S. Pat. No. 3,726,239, discloses a wet scrubber employing a bed of marble for producing a mixture of the wash water and flue gas. The Viers Patent 3,735,567 discussed above utilizes lime rock for neutralizing acid-forming components of the exhaust gases in the muffler structure.

In U.S. Pat. No. 3,751,231, Albert Niedzielski utilizes a porous acid ion exchange resin, such as a resin formed of sulfonated copolymer of styrene and divinylbenzene for removing amines from a steam distribution system.

Another furnace structure which discharges condensate from the flue gases directly to the building drain is shown in U.S. Pat. No. 3,944,136 of Edwin C. Huie.

John D. Hilliard, in U.S. Pat. No. 1,620,155, shown an attachment for oil insulated switches for preventing the throwing out of oil as upon opening of a high-power circuit under oil. Hilliard teaches the use of a housing enclosing a mass of gravel or artificially prepared spheroidal bodies in a serpentine flow path for separating much of the oil vapor and atomized oil from the discharging gases while, at the same time, cooling the gases to a low temperature for safe discharge to the external atmosphere.

SUMMARY OF THE INVENTION

The present invention comprehends an improved domestic furnace system wherein condensate which would otherwise enter or form in the discharge flue as a result of the relatively high efficiency heat transfer effected in the furnace is substantially removed ahead of the flue and neutralized. As indicated above, the products of combustion discharged through such a flue may include acidic components which, when condensed out, form an acidic condensate which may adversely affect the metal or other materials of the conventional domestic drain. The present invention comprehends a means for separating and neutralizing a substantial portion of the acidic condensate so as to permit safe dumping of the condensate to the domestic drain.

The invention further comprehends the provision of such a neutralizing means which is effectively self-flushing so as to effect an automatic removal of sediment therefrom as an incident of the normal cyclic operation of the furnace itself.

More specifically, the invention comprehends the provision of a neutralizer wherein suitable neutralizing material is provided in a flow path arranged to provide sufficient contact between the condensate and neutralizing material for proper neutralizing action. The structure is arranged so that a small amount of the neutralized condensate is discharged as a result of a corresponding amount of acidic condensate being delivered to the inlet of the neutralizer.

In the illustrated embodiment, the furnace is provided with combustion air moving means providing a negative pressure in the combustion chamber and in the condensate separating means which, in turn, is connected to the neutralizer through a suitable conduit. Thus, during the fuel burning operation, a negative pressure is applied to the neutralizer, urging the collected condensate therein back upstream toward the condensate separator. Following termination of the fuel burning operation, operation of the air moving means is also terminated so that the negative pressure is correspondingly removed from the neutralizer. This allows the condensate to run downstream under the influence of gravity, causing a flow through the neutralizer and thereby effecting a desired flushing action therethrough. Th flushing action results from the fact that the flow through the neutralizer under the above conditions is more forceful than the gradual flow that takes place during continuous operation of the air moving means.

The normal flow of the condensate through the condensate separator into the neutralizer may be effected by gravity. As a result of the neutralizer being filled with the condensate being treated by the neutralizing material therein, additional condensate delivered from the separator causes previously neutralized condensate to be urged outwardly from the neutralizer and discharged through a suitable connection to the domestic drain.

The present invention also comprehends the provision of means for collecting condensate that may form in the flue pipe and returning this condensate to the neutralizer. In the illustrated embodiment, this is accomplished by providing a condensate collecting means at the base of a vertically disposed flue pipe and by providing conduit means connecting the collecting means with the inlet side of the condensate separator.

The present invention further comprehends the provision of means for imparting periodic mechanical movement to the neutralizer during operation of the furnace to thereby enhance the effectiveness and self-cleaning of the neutralizing material contained within the neutralizer.

Thus, the present invention comprehends a domestic furnace having condensate treatment means which removes and neutralizes a substantial amount of acidic moisture from the flue gas before the gas passes through an air moving means and enters the furnace flue, thereby reducing the amount of acidic condensate that would otherwise form in these components. The removed condensate is neutralized by means of an inexpensive, self-contained apparatus particularly adapted for use in a domestic furnace.

BRIEF DESCRIPTION OF THE DRAWINGS

Other features and advantages of the invention will be apparent from the following description taken in connection with the accompanying drawings wherein:

FIG. 1 is a front view of a domestic furnace provided with a flue gas condensate treatment means embodying the invention;

FIG. 2 is a fragmentary enlarged perspective view illustrating the condensate neutralizer in greater detail;

FIG. 3 is an enlarged fragmentary elevation illustrating the condensate separator in greater detail; and FIG. 4 is a vertical section taken substantially along the line 4—4 of FIG. 3.

DETAILED DESCRIPTION OF THE INVENTION

In the exemplary embodiment of the invention as disclosed in the drawing, a domestic furnace generally designated 10 is shown to comprise a high efficiency furnace having a primary heat exchanger generally designated 11 and a secondary heat exchanger (not shown). The furnace is provided with a suitable cabinet 12. Products of combustion are discharged from the furnace through a flue 13. An air moving means in the form of a blower 14 is connected to the interconnecting duct 15 leading from the secondary heat exchanger for forcibly discharging the products of combustion resulting from the burning of the fuel as by burner 16.

In the illustrated embodiment, furnace 10 comprises a forced air furnace having a heated air blower 17 mounted in a lower portion of cabinet 12.

As shown in FIG. 1, the duct 15 may be provided with a condensate separator, or collector, 18. As illustrated in FIGS. 3 and 4, the separator may define an enlarged cylindrical housing 19 having a depending baffle 22 extending partially downwardly therethrough causing the flue gases to pass circuitously under the baffle from the inlet 20 to the outlet 21 thereof.

In a high efficiency furnace, such as the present furnace employing a secondary heat exchanger or a furnace having a primary heat exchanger designed to remove a sufficient amount of heat from the combustion gases, the combustion products exiting from the heat exchanger to the flue will contain condensate and some water vapor. The presence of the condensate is due to the relatively low temperature of the gases as they exit from the heat exchanger. It is desirable to remove such condensate prior to the delivery of the flue gas to the air moving means 14 and the flue 13 because the condensate will normally include acidic components.

As shown in FIGS. 1, 3 and 4, the separator is provided with a depending condensate outlet 23 for draining the lower portion of the housing 19 in which the condensate collects. As shown in FIG. 1, the outlet 23 is connected through a flexible conduit 24 to a neutralizer generally designated 25 which, illustratively, may be carried on the sidewall of cabinet 12. Neutralizer 25 effectively neutralizes acidic components of the condensate before discharging the neutralized condensate through a discharge line 26 to the conventional domestic drain 27.

Neutralizer 25 is shown in greater detail in FIG. 2. As illustrated therein, the neutralizer includes an outer housing 28 which may comprise a parallelepiped housing having a top wall 29 provided with an inlet connector 30 to which the lower end of conduit 24 is connected. An outlet connector 31 is further provided in the top wall 29 for connection thereto of the drain line 26.

The interior of housing 28 may be divided by a plurality of baffles 32 to define a serpentine path 33 through which condensate from separator 18 must flow in passing from inlet 30 to outlet 31. Suitable neutralizing material 34 is provided within the housing for neutralizing the acidic components of the condensate within the neutralizer. Illustratively, the neutralizing material may comprise crushed limestone or calcium carbonate, etc.

The continued effectiveness of the neutralizing material can be enhanced by periodically imparting mechanical movement, such as vibration, to the neutralizer. Such movement helps reduce caking or the build up of residue on the particles of crushed limestone or other neutralizing material used. While movement of the neutralizer can be provided by a number of means, advantageous use of a source of vibration already present in the furnace, such as blower 17, can be made.

As shown, the housing 28 may be mounted to the sidewall of cabinet 12 by suitable bracket 35. To facilitate neutralization, the neutralizer may be agitated or vibrated as by mechanical interconnection to the blower 17. In the illustrated embodiment, the mechanical interconnection is effected by a bracket 36 having one leg connected to the blower and one leg connected to the housing 28. Alternatively, the neutralizer may be mounted to the blower rather than to the sidewall of cabinet 12.

The furnace may include suitable controls 37 for controlling the automatic heating operation. More specifically, the furnace is controlled so as to cause operation of the blower 14 concurrently with the operation of the burner 16.

After a period of time of operation of the furnace, a sufficient amount of condensate is transferred from the separator 18 to the neutralizer so as to completely fill the neutralizer. Thus, additional condensate delivered from the separator under this condition will cause a corresponding amount of the neutralized condensate to pass outwardly through connector 31 and conduit 26 to drain 27. Such transfer is automatically effected by gravity without the need for valves, pumps, etc.

As can be seen in FIG. 1, when blower 14 is operated to discharge the products of combustion upwardly through the flue 13, a negative pressure is created within the separator 18 in drawing the products of combustion therethrough. At the same time, this negative pressure is present in the condensate outlet 23, conduit 24, and inlet connector 30 on the neutralizer. When the furnace cycles off so as to discontinue burning operation of the fuel in burner 16 and the operation of blower 14, the negative pressure on the inlet portion of the neutralizer is eliminated, allowing liquid in the neutralizer to seek the normal level therein. When the negative pressure is applied, however, it tends to draw the condensate collected in the neutralizer 25 back upwardly through the inlet connector 30 and into conduit 24. The neutralizer is constructed and arranged to make advantageous use of this pressure change, as described below.

Due to the action of the acidic condensate on the neutralizing material, a sediment builds up within the neutralizer over a period of operation, and it is desirable to prevent this sediment from building up to a point where operation of the neutralizer is inhibited due to clogging or caking of the neutralizing material. The gradual flow of condensate during operation of the burner 16 and blower 14 may not be sufficiently forceful to flush an appreciable amount of sediment through the neutralizer. A more forceful flushing action can be obtained, however, by locating the neutralizer such that the condensate drawn back upstream toward the separator under negative pressure conditions is periodically caused to flow rapidly back into the neutralizer under the influence of gravity upon termination of the negative pressure. This forceful return flow of the condensate causes a comparatively rapid discharge of condensate from the neutralizer outlet 31, and this discharge carries with it a portion of the accumulated sediment.

To create this self flushing action, the neutralizer inlet 30 should be located sufficiently below the separator condensate outlet 23 and conduit 24 should be sized so as to create a head or reservoir above the neutralizer into which an amount of condensate can be drawn during negative pressure conditions. It is necessary that the neutralizer be constructed so as to prevent air from being drawn therethrough from its outlet 31 to its inlet 30 during such conditions, since such an air bypass would prevent condensate from being drawn upstream into the conduit 24. The serpentine flow path created by baffles 32 prevents such a bypass and ensures a first in-first out, or serial, flow that is desirable for best neutralizing action.

It has been found that a self flushing action does not necessarily take place after each cycle of the blower 14, but that the head of condensate formed or drawn back upstream into conduit 24 during negative pressure conditions gradually increases with each cycle of the furnace until the rapid, forceful flushing occurs. By way of example for a neutralizer constructed as shown in FIG. 2 and containing approximately four pounds of marble stone as the neutralizing agent, a condensate head of approximately four inches will build up under negative pressure in conduit 24 after about 25 cycles of the furnace. It is at this point that a rapid, and hence, forceful, flushing action takes place upon removal of the negative pressure in conduit 24. Prior to this forceful flushing action, the condensate drawn into conduit 24 above the neutralizer flows slowly back into the neutralizer at the end of each cycle, without creating a forceful flushing action. This gradual back-and-forth flow of condensate through the neutralizer prior to the rapid flushing action is also believed to enhance the neutralizing action because it provides a mild stirring or washing effect.

Thus, the neutralizer utilizes variable pressure conditions existing within the furnace structure to effect the desired self-flushing and self-washing action. As a result, facilitated neutralizing action is provided, permitting the condensate from the combustion products to be drained directly to the conventional household drain in a novel and simple manner. The self-flushing and self-washing action provides high efficiency in the utilization of the neutralizing material within the neutralizer so that a long operating life between rechargings of the neutralizer is obtained. Again, by way of example, a natural gas furnace having a heating capacity of 80,000 BTU/hour produced condensate at a rate of approximately six pounds per hour of operation, and the rate of consumption of neutralizing material was measured to be 0.81 pounds per 1800 hours of operation for the neutralizer structure shown and described herein.

Proper operation of the separator 18 notwithstanding, some condensate may accumulate in the flue 13 as the flue gases are passed therethrough. The present invention provides means for preventing this condensate from running down the flue 13 and into the blower 14 during periods when the furnace has cycled off. Referring to FIGS. 2 and 3, a manifold or collecting means 38 is provided at the outlet of the blower 14. The blower 14 discharges horizontally into the collecting means 38 and flue pipe 13 extends vertically therefrom. A flexible conduit 39 connects the lower portion of collecting means to a second inlet 20a on separator 18. Thus, any condensate running down the flue 13 will collect in the collecting means 38 and be conducted to the separator 18 instead of entering blower 14.

The neutralizing means of the present invention is particularly useful in connection with high efficiency furnaces, such as those having a thermal efficiency of 90% or more, in which a considerable amount of condensate will form due to the relatively low temperature of the products of combustion as they are discharged from the furnace.

The neutralizer is relatively small and simple so as to be economical of construction and readily mounted within the furnace structure. The neutralizing material is readily obtainable and is similarly low cost.

The foregoing disclosure of specific embodiments is illustrative of the broad inventive concepts comprehended by the invention.

Having described the invention, the embodiments of the invention in which an exclusive property or privilege is claimed are defined as follows:

1. In a domestic furnace having means for burning fuel resultingly producing gaseous products of combustion having water vapor therein, and means for exhausting said gaseous products of combustion, the improvement comprising:

separating means associated with said exhaust means for converting said water vapor to a liquid condensate and removing said condensate from said products of combustion;

conducting means for conducting said condensate from said separating means;

condensate treatment means for receiving said condensate from said conducting means and reducing the acidity thereof; and means for imparting mechanical movement to said condensate treatment means during the operation of said furnace to maintain the neutralizing effectiveness thereof.

2. The domestic furnace structure of claim 1 wherein said means for imparting mechanical movement comprises means for vibrating said condensate treatment means.

3. The domestic furnace structure of claim 1 wherein said means for imparting mechanical movement is energized substantially concurrently with said fuel burning means.

4. The domestic furnace structure of claim 1 wherein said means for imparting mechanical movement comprises an electro-mechanical component normally energized during operation of said furnace.

5. In a domestic furnace having means for burning fuel resultingly producing gaseous products of combustion, and exhaust passage means for exhausting the gaseous products of combustion free of addition of water vapor thereto, the improvement comprising:
   condensate treatment means arranged to receive condensate from said exhaust passage means which may result from a low temperature condition of said products of combustion in said passage means including a housing containing a neutralizing material for contacting condensate delivered to said housing; and
   means for vibrating said housing for at least a portion of the time said burner is in operation.

6. The domestic furnace structure of claim 5 wherein said furnace includes a blower and said condensate treatment housing is mechanically coupled to said blower such that said housing is vibrated by said blower during periods when said blower is operating.

7. In a domestic furnace having a burner, a heat exchanger for receiving gaseous products of combustion from said burner, exhaust means for receiving products of combustion from said heat exchanger, condensate treatment means disposed in spaced relationship to said exhaust means, and passage means connected to said exhaust means and arranged to conduct condensate therefrom to said treatment means for treatment of the condensate, the improvement comprising:
   a source of vibration that is energized during periods when said burner is operating; and
   means coupling said source of vibration to said condensate treatment means to vibrate said treatment means for maintaining effectiveness of the treatment means.

8. The furnace structure of claim 7 wherein said condensate treatment means includes a housing defining a condensate flow path therethrough and particles of condensate treating material are contained within at least a portion of said flow path.

9. The furnace structure of claim 7 wherein said source of vibration comprises a blower for circulating air through said heat exchanger.

10. The furnace structure of claim 9 wherein said blower includes an external housing and said condensate treatment means is mounted to said housing.

11. The furnace structure of claim 7 wherein said passage means comprises a flexible conduit.

\* \* \* \* \*